US012623130B1

(12) United States Patent
  Larson et al.

(10) Patent No.: US 12,623,130 B1
(45) Date of Patent: May 12, 2026

(54) BOCCE BALL MEASUREMENT DEVICE

(71) Applicant: All In Sports, LLC, Papillion, NE (US)

(72) Inventors: Jeff Larson, Papillion, NE (US); Suzanne Larson, Papillion, NE (US)

(73) Assignee: All In Sports, LLC, Papillion, NE (US)

( * ) Notice: Subject to any disclaimer, the term of this patent is extended or adjusted under 35 U.S.C. 154(b) by 343 days.

(21) Appl. No.: 18/331,727

(22) Filed: Jun. 8, 2023

Related U.S. Application Data

(60) Provisional application No. 63/350,278, filed on Jun. 8, 2022.

(51) Int. Cl.
  *G01B 3/1005* (2020.01)
  *A63B 67/06* (2006.01)
  *G01B 3/1048* (2020.01)

(52) U.S. Cl.
  CPC .......... *A63B 67/068* (2013.01); *G01B 3/1005* (2013.01); *G01B 3/1048* (2020.01); *G01B 2003/103* (2013.01)

(58) Field of Classification Search
  CPC .. A63B 67/068; G01B 3/1005; G01B 3/1048; G01B 2003/103
  See application file for complete search history.

(56) References Cited

U.S. PATENT DOCUMENTS

| | | | | |
|---|---|---|---|---|
| 6,754,974 B2 * | 6/2004 | Bassolino | ............ | A63B 67/068 |
| | | | | 33/1 G |
| 6,877,245 B2 * | 4/2005 | Brohammer | ......... | A63B 67/068 |
| | | | | 273/108 |
| 7,059,064 B2 * | 6/2006 | Brohammer | ......... | A63B 67/068 |
| | | | | 273/108 |
| 8,760,633 B2 * | 6/2014 | Neary | ................. | A63B 67/068 |
| | | | | 356/5.01 |
| 9,808,691 B2 * | 11/2017 | Dascanio | .............. | G01S 7/4813 |
| 9,829,299 B1 * | 11/2017 | Bennett | ................. | G01B 21/16 |
| 2004/0049938 A1 * | 3/2004 | Bassolino | ............ | A63B 67/068 |
| | | | | 33/759 |
| 2006/0000105 A1 * | 1/2006 | Brohammer | ......... | A63B 67/068 |
| | | | | 33/756 |
| 2007/0262518 A1 * | 11/2007 | Lapinski | .............. | A63B 67/066 |
| | | | | 273/108.2 |

* cited by examiner

*Primary Examiner* — Yaritza Guadalupe-Mccall
(74) *Attorney, Agent, or Firm* — Ryan T. Grace; Advent, LLP

(57) ABSTRACT

A bocce ball measurement device includes a support surface for being supported over a pallino ball and a generally cylindrical wall for supporting the support surface over the pallino ball. The generally cylindrical wall has an inside diameter greater than a diameter of the pallino ball for encircling the pallino ball without touching it when placed around the pallino ball. A housing is coupled with the support surface at a center of the support surface. A retractable measurement ribbon is stowable within the housing. A first end of the housing can provide an index for reading a measurement on the retractable measurement ribbon. The bocce ball measurement device further includes a biasing mechanism coupled with the retractable measurement ribbon for biasing the retractable measurement ribbon into a retracted orientation within the housing so that the retractable measurement ribbon can be retracted and stowed within the housing.

13 Claims, 7 Drawing Sheets

100

112

102

BOCCE BALL MEASUREMENT DEVICE

CROSS-REFERENCE TO RELATED APPLICATIONS

The present application claims the benefit under 35 U.S.C. § 119 (e) of U.S. Provisional Application Ser. No. 63/350,278, filed Jun. 8, 2022, and titled "BOCCE BALL MEASUREMENT DEVICE," which is herein incorporated by reference in its entirety.

BACKGROUND

Bocce is a game played on a stretch of level ground. Bocce involves two teams and nine balls total, which include four balls of one color for one team, four balls of another color for the other team, and one pallino ball. The pallino ball is rolled onto the playing surface. The object of the game is for one team to get one or more of their color bocce balls closer to the pallino ball than the closest ball for the other team.

DRAWINGS

The Detailed Description is described with reference to the accompanying figures. The use of the same reference numbers in different instances in the description and the figures may indicate similar or identical items.

DETAILED DESCRIPTION

Figure 1:
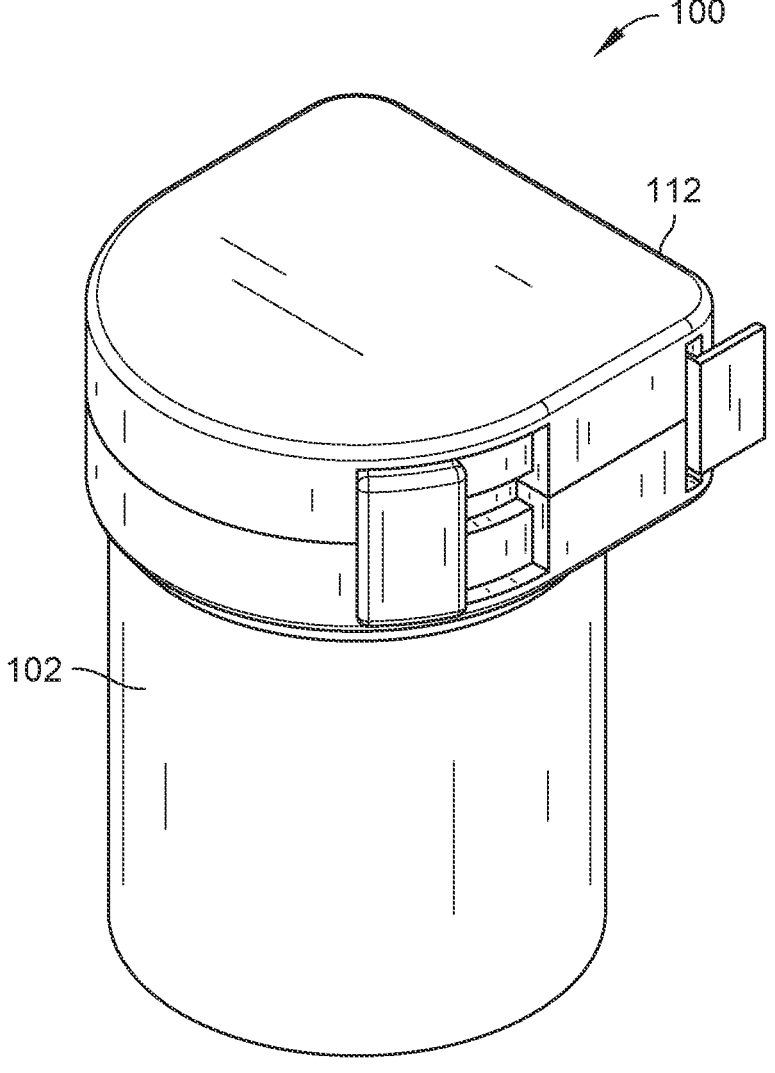
FIG. 1 is a perspective view illustrating a bocce ball measurement device in accordance with example embodiments of the present disclosure.
Figure 2:
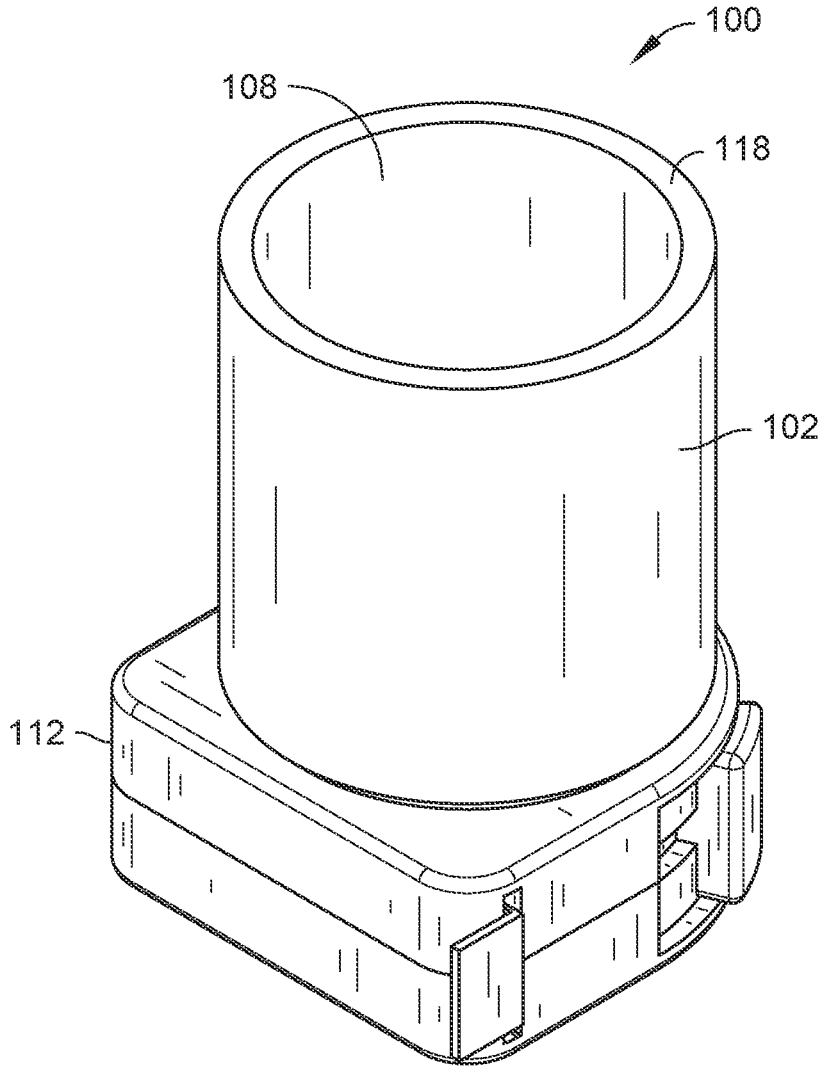
FIG. 2 is another perspective view illustrating a bocce ball measurement device, such as the bocce ball measurement device of FIG. 1, in accordance with example embodiments of the present disclosure.
Figure 3:
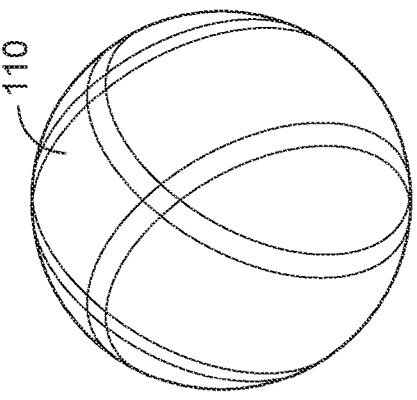
FIG. 3 is an environmental view illustrating a bocce ball measurement device, such as the bocce ball measurement device of FIG. 1, further illustrating a pallino ball and bocce balls, in accordance with example embodiments of the present disclosure.
Figure 3:
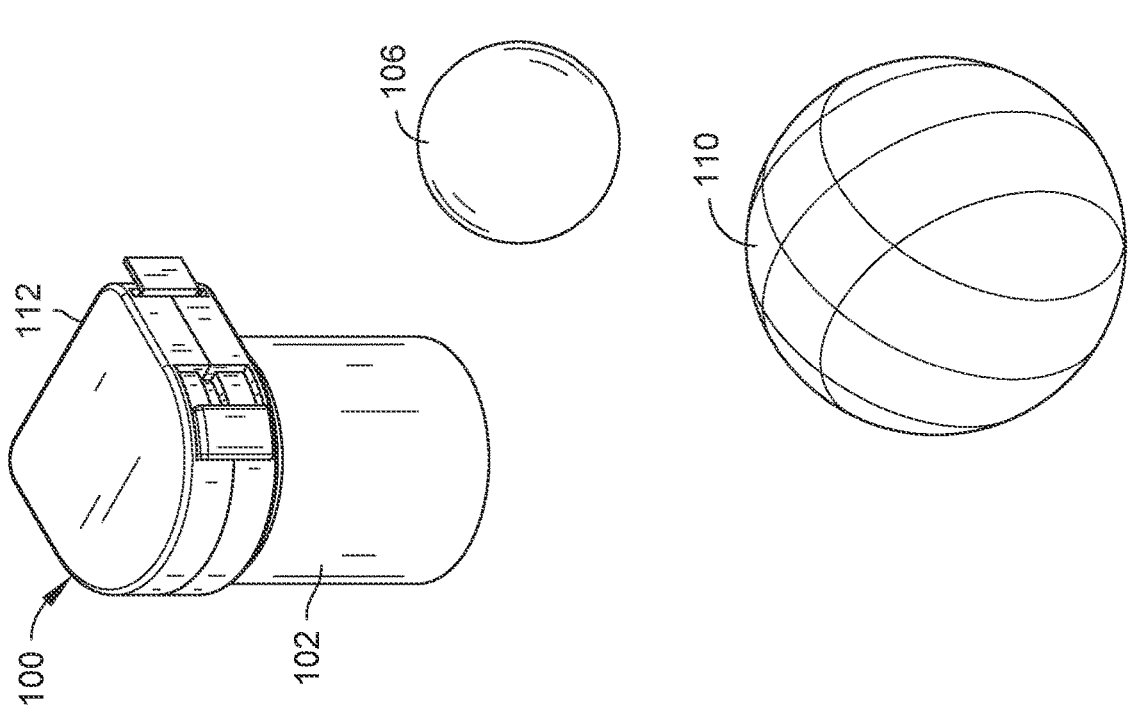
Figure 4:
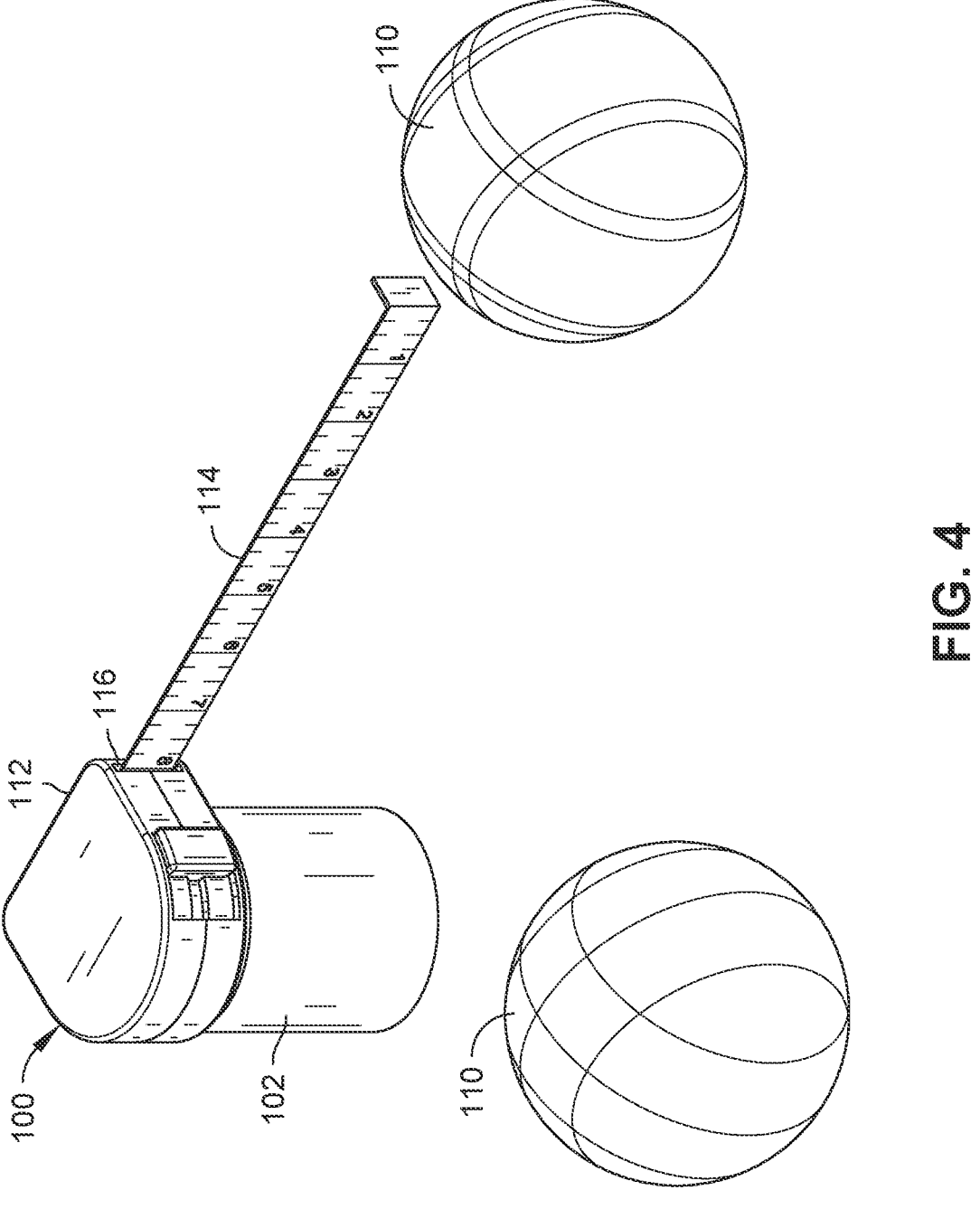
FIG. 4 is an environmental view illustrating a bocce ball measurement device, such as the bocce ball measurement device of FIG. 1, further illustrating a retractable measurement ribbon for measuring the distance to a bocce ball, in accordance with example embodiments of the present disclosure.
Figure 5:
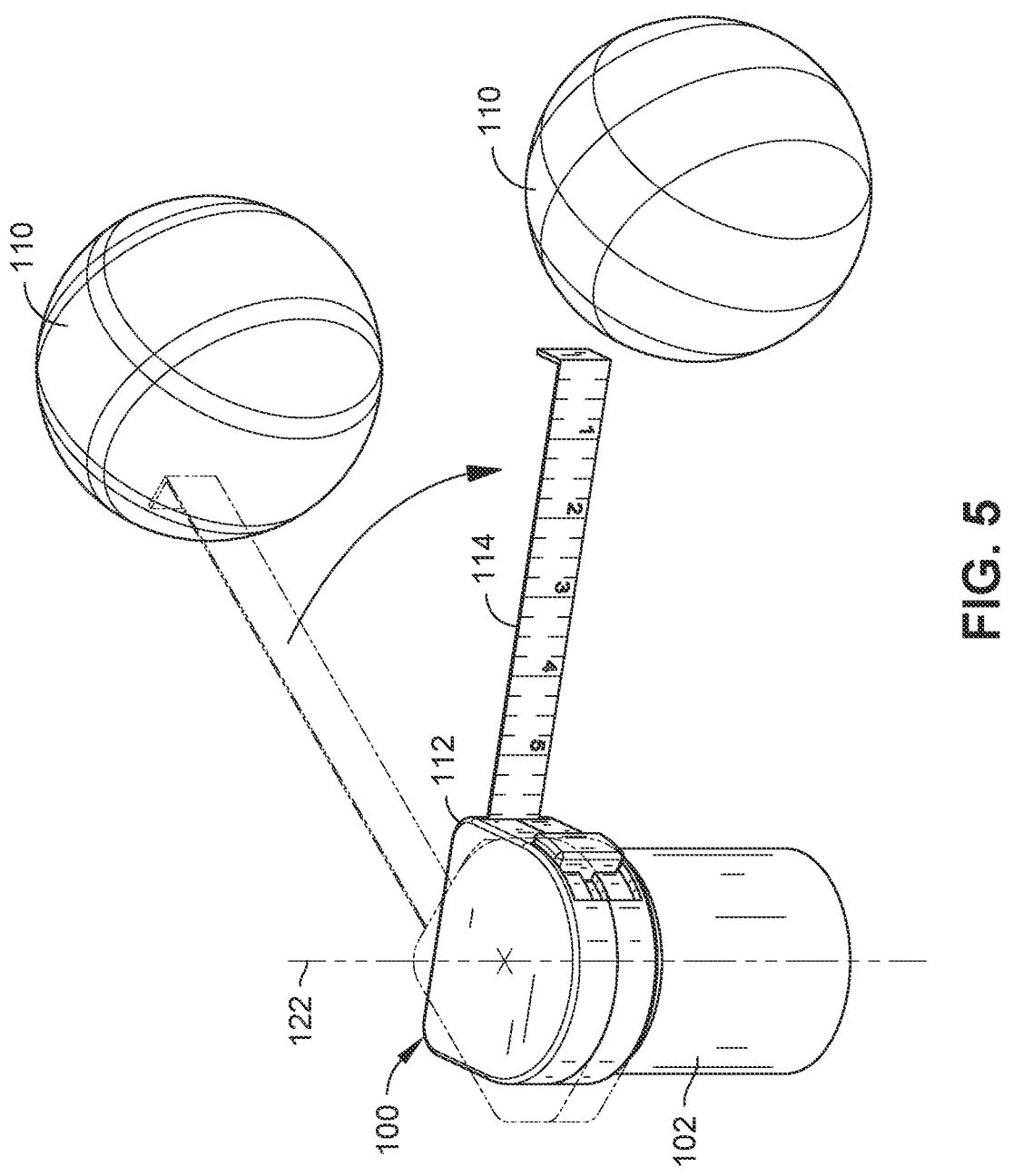
FIG. 5 is another environmental view illustrating a bocce ball measurement device, such as the bocce ball measurement device of FIG. 1, further illustrating a retractable measurement ribbon for measure the distance to a bocce ball, in accordance with example embodiments of the present disclosure.

Aspects of the disclosure are described more fully hereinafter with reference to the accompanying drawings, which form a part hereof, and which show, by way of illustration, example features. The features can, however, be embodied in many different forms and should not be construed as limited to the combinations set forth herein; rather, these combinations are provided so that this disclosure will be thorough and complete, and will fully convey the scope. The following detailed description is, therefore, not to be taken in a limiting sense.

Bocce is one of the most popular sports in the world. Overseen by the International Bocce Federation, bocce is played nationally and internationally. Bocce is included in various international multi-sport events such as: Paralympic Games, Special Olympics, Mediterranean Games, World Games, some of the continental games and youth festivals, and so forth, and has made strong bids to become an Olympic sport. Since the sport is played on multiple levels, consistency in rules and scoring is of paramount importance, and increasing fairness and objectivity is essential for furthering a more widespread adoption of bocce in international multi-sport competitions.

A bocce court is approximately 55 to 91 feet (16.8 to 27.7 meters) in length and approximately 8.2 to 13.1 feet (2.5 to 4 meters) wide. Bocce is played with a small ball called a pallino (also known as a jack or boccino) and a set of larger bocce balls. The pallino generally has a diameter in the range of one and one-half inches (1½") to two and one-half inches (2½") (approximately 38.1 millimeters to 63.5 millimeters). The bocce balls generally have a diameter in the range of three and one-half inches (3½") to four and one-half inches (4½") (approximately 88.9 millimeters to 114.3 millimeters). The size of the court, the pallino, and the bocce balls may vary depending on the level of play, preference, and/or space constraints. In Special Olympics play, for example, the bocce court is approximately 60 feet by 12 feet (18.3 meters by 3.7 meters), the pallino is approximately 2.2 inches (57 millimeters) in diameter, and the bocce balls are approximately 4.2 inches (107 millimeters) in diameter.

To play bocce, one of two players (or teams) throws the pallino from one end of the bocce court. The players or teams then throw or roll the larger bocce ball onto the court, attempting to place their ball closer to the pallino than the closest ball of the other team. The player or team with the ball closest to the pallino can score, and they score one point for each ball that is closer to the pallino than the closest ball of the other player or team. Play continues until a winning score is achieved, which can vary by region. It is important to obtain a proper measurement for the proximity of the closest ball, or balls, for one team to the pallino ball.

Unfortunately, scoring can be complicated by difficulty in determining which team or player has a ball closest to the pallino. The game of bocce often resorts to generic measurement tools (e.g., yardstick, measurement tape, etc.) in determining what colored bocce ball is closest to the pallino. These measurement devices are not designed for the sport of bocce, and can lead to inaccuracies of measurement due to not being able to get close enough to the pallino ball or other bocce balls, or moving the pallino ball or other bocce balls by bumping them in an attempt to get an accurate measurement. These generic measurement devices are prone to human error and lead to further complications resulting in arguments of which team's bocce ball is actually closest to the pallino. Repeated measurements and added arguments can extend a single round of bocce by as much as 20 minutes or more.

Accordingly, aspects of this disclosure relate to a bocce ball measurement device for placing over a pallino ball to determine a distance between the pallino ball and a bocce ball. The bocce ball measurement device includes a support surface for being supported over the pallino ball and a generally cylindrical wall for supporting the support surface over the pallino ball. The generally cylindrical wall has a diameter greater than a diameter of the pallino ball for encircling the pallino ball without touching it when placed around the pallino ball. A housing is fixedly and rotatably coupled with the support surface at a center of the support surface. A retractable measurement ribbon is stowable within the housing. A first end of the housing can provide an index for reading a measurement on the retractable measurement ribbon. The index is configured to generally align with the pallino ball for determining a distance from pallino ball to a bocce ball. The bocce ball measurement device further includes a biasing mechanism coupled with the retractable measurement ribbon for biasing the retractable measurement ribbon into a retracted orientation within the housing so that the retractable measurement ribbon can be retracted and stowed within the housing.

Figure 6:
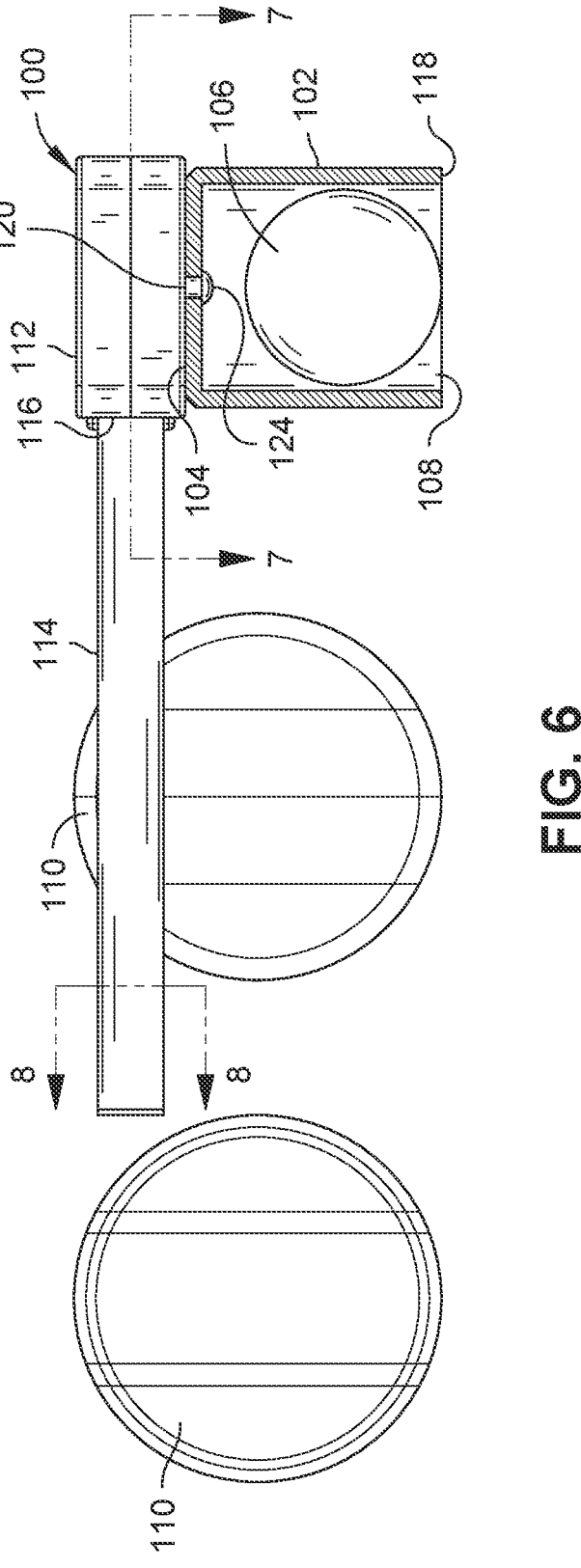
FIG. 6 is another environmental view illustrating a bocce ball measurement device, such as the bocce ball measurement device of FIG. 1, in accordance with example embodiments of the present disclosure.
Figure 7:
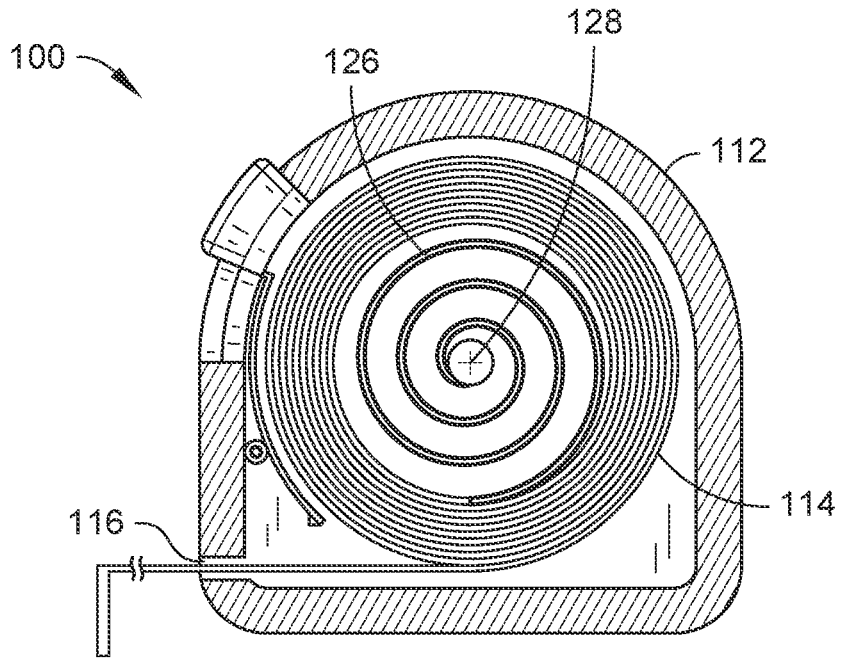
FIG. 7 is a partial cross-sectional top plan view of the bocce ball measurement device illustrated in FIG. 6, taken on the line 7-7 in FIG. 6.
Figure 8:
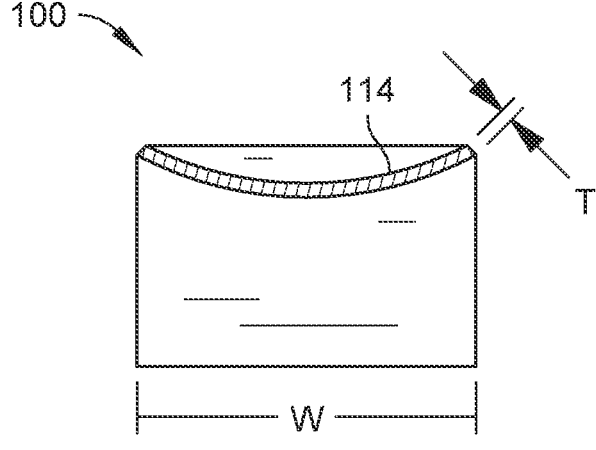
FIG. 8 is a partial cross-sectional end elevation view of the bocce ball measurement device illustrated in FIG. 6, taken on the line 8-8 in FIG. 6.

Referring generally to FIGS. 1 through 8, a bocce ball measurement device 100 is described in accordance with example embodiments of the present disclosure. In embodiments, the bocce ball measurement device 100 includes a generally cylindrical wall 102 and a generally flat support surface 104 (FIG. 6). The generally cylindrical wall 102 is configured for placement over a pallino ball 106 and supports the support surface 104 over the pallino ball 106. In embodiments, the height of the generally cylindrical wall 102 is selected to support the support surface 104 over the pallino ball 106 when a base 118 of the generally cylindrical wall 102 is resting on a surface (e.g., the bocce court). In a specific embodiment, the support surface 104 is about two and fifteen-sixteenths inches (2¹⁵⁄₁₆") from a base 118 of the generally cylindrical wall 102. In some embodiments, the support surface 104 and/or the generally cylindrical wall 102 can be formed from one or more rigid materials, including, but not limited to: plastic, polyvinyl chloride (PVC), other plastic polymers, aluminum, steel, other metals, wood, other wood composite materials, and so forth. In a specific embodiment, the support surface 104 and/or the generally cylindrical wall 102 is formed from PVC.

In embodiments, the generally cylindrical wall 102 includes an opening 108 at the base 118 that is configured to fit around (e.g., encircle) one or more of the game balls (e.g., a pallino ball 106). In some embodiments, the generally cylindrical wall 102 has a diameter selected to form an opening 108 at the base of the generally cylindrical wall 102 that is greater in diameter than the diameter of the pallino ball 106. For example, the generally cylindrical wall 102 can have an inside diameter that is greater than the diameter of the pallino ball 106 for encircling the pallino ball 106 without touching the pallino ball 106 when placed around it. In example embodiments, the generally cylindrical wall 102 has an inside diameter in the range of one and five-eighths inches (1⅝") to three inches (3"), and an outside diameter in the range of two inches (2") to three and three-eighths inches (3⅜"). In a specific embodiment, the generally cylindrical wall 102 has an inside diameter of two and three-eighths inches (2⅜"), and an outside diameter of two and three-quarters inches (2¾"). However, these dimensions are offered by way of example only and are not meant to be restrictive of the present disclosure. In other embodiments, the generally cylindrical wall 102 may have a diameter greater than the diameter of a larger bocce ball 110. For example, the generally cylindrical wall 102 can have an inside diameter in the range of two and seven-eighths inches (2⅞") to four and three-fourths inches (4¾"), and an outside diameter in the range of three and one-fourth inches (3¼") to five and one-eighth inches (5⅛").

In embodiments, the support surface 104 is fixedly (e.g., permanently) coupled with a housing 112 for stowing a measurement instrument (e.g., a retractable measurement ribbon 114). The housing 112 can be coupled to the support surface 104 at the center 120 (FIG. 6) of the support surface. The housing 112 is coupled to the support surface 104 in manner that allows rotation of the housing 112 and the retractable measurement ribbon 114 stowed within around a central axis 122 (FIG. 5) of the housing 112, while the generally cylindrical wall 102 and the support surface 104 remain stationary. In some embodiments, the housing 112 is secured to the support surface 104 by a fixed pivot fastener 124 (FIG. 6) that permits rotational movement of the housing 112 about the fixed pivot fastener 124. Example fixed pivot fasteners 124 can include, but not are not necessarily limited to: a rivet, a nut and bolt, a screw, a bolt, anchors, and so forth. In a specific embodiment, the housing 112 is riveted to the support surface 104 at the center 120 of the support surface 104. Rotation of the housing 112 and retractable measurement ribbon 114 independent of the generally cylindrical wall 102 and the support surface 104 permits the generally cylindrical wall 102 to remain in place, e.g., with respect to the bocce court. The retractable measurement ribbon 114 can thus be rotated to each bocce ball 110 without disturbing the position of the pallino ball 106 encircled by the generally cylindrical wall 102. In such a manner, human measurement error is reduced by minimizing the risk of disturbing the placement of either the pallino ball 106 or the bocce balls 110 during measurement, improving measurement and scoring accuracy. Human error is further reduced by the fixed coupling of the housing 112 to the support surface 104, which prevents lateral and/or vertical movements of the housing that could result in measurement inaccuracies.

In embodiments, the retractable measurement ribbon 114 can consist of any suitable measurement instrument that is extensible from the housing 112. In example embodiments, the retractable measurement ribbon 114 includes, but is not necessarily limited to: a foldable ruler, a foldable fabric measuring tape, a measuring tape blade, and so forth. In a specific embodiment, the retractable measurement ribbon 114 consists of a measuring tape blade. The blade may consist of a long, narrow strip of metal or other flexible material such as, for example, cloth, plastic, or fiber glass. The blade can have a long length L (e.g., in the range of 25 feet to 100 feet), a narrow width W (e.g., in the range of 0.5 inch to 1 inch), and a minor thickness T (e.g., in the range of 0.1 millimeters to 0.5 millimeters) that define an upper surface and a lower surface of the blade, e.g., as described with reference to FIG. 8. The retractable measurement ribbon 114 includes a representation of measurements in imperial and/or metric units. For example, the blade can include measurement markings on the upper surface, the lower surface, or both. The markings may be spaced at regular intervals (e.g., every sixteenth of an inch) and may have associated labels to assist a player in obtaining a measurement reading. In a specific embodiment, the retractable measurement ribbon 114 consists of a blade having a curved cross-sectional profile, e.g., as described with reference to FIG. 8. The cross-sectional profile can increase standout and decrease drooping of the retractable measurement ribbon 114. Increasing blade standout can provide increased accuracy in measuring the distance between the pallino ball 106 and the bocce balls 110.

In embodiments, a first end of the housing 112 provides an index 116 for reading a measurement on the retractable measurement ribbon 114. The index 116 can be configured to generally align with position of the position of the pallino ball 106 when the pallino ball 106 is encircled by the generally cylindrical wall 102 for determining a distance from the pallino ball 106 to a bocce ball 110. Aligning the index 116 with the position of the pallino ball 106 provides a consistent measurement of the distance from the pallino ball 106 to a bocce ball 110. The fixed coupling of the housing 112 to the support surface 104, as described above, ensures that the index 116 is consistently aligned with the pallino ball 106.

In embodiments, the bocce ball measurement device 100 includes a biasing mechanism 126 that is coupled with the retractable measurement ribbon 114. The biasing mechanism 126 is configured to bias the retractable measurement ribbon 114 into a retracted orientation within the housing 112 so that the retractable measurement ribbon 114 can be retracted and stowed within the housing 112. In example embodiments, the biasing mechanism 126 can include, but is not necessarily limited to: a spring return mechanism, a lever winding mechanism, and so forth. As described, the biasing mechanism 126 can have an axis of rotation 128 about which the retractable measurement ribbon 114 retracts, e.g., as described with reference to the spring return biasing mechanism 126 illustrated in FIG. 7. In embodiments, the axis of rotation 128 of the biasing mechanism 126 can be at least substantially aligned with the center 120 of the support surface 104. The retractability of the retractable measurement ribbon 114 reduces human error by minimizing accidental bumping or moving of the bocce balls 110. The retractability of the retractable measurement ribbon 114 also facilitates grasping and carrying of the bocce ball measurement device 100 by a player between measurements by either the generally cylindrical wall 102 or the housing 112.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A bocce ball measurement device for placing over a pallino ball to determine a distance between the pallino ball and a bocce ball, the bocce ball measurement device comprising:

a support surface for being supported over a pallino ball;

a generally cylindrical wall for supporting the support surface over the pallino ball, the generally cylindrical wall having an inside diameter greater than a diameter of the pallino ball for encircling the pallino ball without touching the pallino ball when placed around the pallino ball;

a housing rotatably coupled with the support surface at a center of the support surface, the housing fixedly connected to the support surface, the housing having a first end;

a retractable measurement ribbon stowable within the housing, the first end of the housing providing an index for reading a measurement on the retractable measurement ribbon, the index configured to generally align with the pallino ball for determining a distance from pallino ball to a bocce ball; and a biasing mechanism coupled with the retractable measurement ribbon for biasing the retractable measurement ribbon into a retracted orientation within the housing so that the retractable measurement ribbon can be retracted and stowed within the housing, and the bocce ball measurement device can be grasped and carried between measurements by either the generally cylindrical wall or the housing, the biasing mechanism having an axis of rotation about which the retractable measurement ribbon retracts, the axis of rotation of the biasing mechanism at least substantially aligned with the center of the support surface.

2. The bocce ball measurement device as recited in claim 1, wherein the housing is riveted to the support surface at the center of the support surface.

3. The bocce ball measurement device as recited in claim 1, wherein the retractable measurement ribbon comprises a blade having a curved cross-sectional profile.

4. The bocce ball measurement device as recited in claim 1, wherein the biasing mechanism comprises a spring return mechanism.

5. The bocce ball measurement device as recited in claim 1, wherein the generally cylindrical wall has an outside diameter of about two and three-quarters inches (2¾").

6. The bocce ball measurement device as recited in claim 1, wherein the generally cylindrical wall has an inside diameter of about two and three-eighths inches (2⅜").

7. The bocce ball measurement device as recited in claim 1, wherein the support surface is about two and fifteen-sixteenths inches (2¹⁵⁄₁₆") from a base of the generally cylindrical wall.

8. A bocce ball measurement device for placing over a pallino ball to determine a distance between the pallino ball and a bocce ball, the bocce ball measurement device comprising:

a support surface for being supported over a pallino ball;

a generally cylindrical wall for supporting the support surface over the pallino ball, the generally cylindrical wall having an inside diameter greater than a diameter of the pallino ball for encircling the pallino ball without touching the pallino ball when placed around the pallino ball;

a housing rotatably coupled with the support surface at a center of the support surface, the housing riveted to the support surface, the housing having a first end;

a retractable measurement ribbon stowable within the housing, the first end of the housing providing an index for reading a measurement on the retractable measurement ribbon, the index configured to generally align with the pallino ball for determining a distance from pallino ball to a bocce ball; and a biasing mechanism coupled with the retractable measurement ribbon for biasing the retractable measurement ribbon into a retracted orientation within the housing so that the retractable measurement ribbon can be retracted and stowed within the housing, and the bocce ball measurement device can be grasped and carried between measurements by either the generally cylindrical wall or the housing, the biasing mechanism having an axis of rotation about which the retractable measurement ribbon retracts, the axis of rotation of the biasing mechanism at least substantially aligned with the center of the support surface.

9. The bocce ball measurement device as recited in claim 8, wherein the retractable measurement ribbon comprises a blade having a curved cross-sectional profile.

10. The bocce ball measurement device as recited in claim 8, wherein the biasing mechanism comprises a spring return mechanism.

11. The bocce ball measurement device as recited in claim 8, wherein the generally cylindrical wall has an outside diameter of about two and three-quarters inches (2¾").

12. The bocce ball measurement device as recited in claim 8, wherein the generally cylindrical wall has an inside diameter of about two and three-eighths inches (2⅜").

13. The bocce ball measurement device as recited in claim 8, wherein the support surface is about two and fifteen-sixteenths inches (2¹⁵⁄₁₆") from a base of the generally cylindrical wall.

\* \* \* \* \*